United States Patent Office 2,805,932
Patented Sept. 10, 1957

2,805,932

PROCESS FOR THE TREATMENT OF STEEL SMELTINGS WITH LIGHT METALS

Paul Menzen, Bochum, Westphalia, Germany

No Drawing. Application February 23, 1954,
Serial No. 412,081

Claims priority, application Germany February 25, 1953

7 Claims. (Cl. 75—58)

Steel melts containing carbon are generally subjected to a deoxidizing treatment by means of ferro manganese and to some extent ferrosilicon in order to disintegrate the oxygen content, mostly in the form of ferrous oxide, the degree of deoxidation attained being determined both by the quantity of the deoxidizing agent added and also by the time and intensity of its action on the steel melt. The residue of oxygen or ferrous oxide left over is subjected to further treatment with aluminium before being cast in order to "kill" the melt, and for this purpose the aluminium was hitherto introduced mostly in the form of pigs or bars; in special instances aluminium granulated by quenching in water is also used. Although aluminium, on account of its high affinity for oxygen, quickly decomposes with heavy metal oxides on being brought into contact therewith, the final products obtained by the treatment hitherto employed, on being tested, often showed defects, such as blowholes below the surface, which are produced by a too high residual content of oxygen in the melt.

The invention is based on the recognition of the fact that unsatisfactory efficiency of the aluminium addition is attributable to the imperfect distribution, which can be explained by the great difference in the specific gravities of the iron and the light metal. This difference in weight imparts to every relatively large aluminium body such buoyancy that, after a short time has elapsed, it always returns to the surface of the bath and therefore has not sufficient time for a complete process of reaction in the melt; on the surface the aluminium bodies can only act on portions of the melt in direct contact with it and moreover can lead to the concentration of alumina in the slag and to the stiffening thereof. The objections of imperfect distribution of the aluminium become particularly apparent in the case of large additions such as are employed, for example, for smelting steel which resist ageing and alkalies. The formation of aluminium streaks with the material defects resulting therefrom is especially objectionable.

The formation of streaks takes place when a steel melt converts the aluminium into the liquid phase but is not capable of dissolving the aluminium portion of the melt within the period of action and to distribute it uniformly over the entire melt. Common to all these undesirable aspects is the fact that they become more apparent the greater the bulk of the individual aluminium bodies which are introduced.

In the treatment of steel or iron melts with light metals, such as aluminium, magnesium, calcium and/or alloys of these metals according to the invention, the metal addition is introduced in such small particles that, in spite of the buoyancy due to the difference in the specific gravity of steel and the light metal addition, it is capable of reacting with the components of the melt to a sufficient extent.

The laws by which lighter materials rise in heavier liquids correspond entirely to those which apply in the case of heavy bodies in lighter gases or liquids. The static speed in rising decreases proportionately with the increase of the specific gravity and also with the increase in the ratio O/V (surface:volume). By the choice of sufficiently small particles it is therefore possible to attain speeds at which the particles require to travel from the bottom of the bath to the surface, which are many times greater than the period of treatment. If the metal addition is sufficiently uniformly distributed in the bath, such distribution remains for a period of time which is sufficiently long for the desired reaction process to take place, without the lighter metal reaching the surface of the bath prematurely and therefore unused. At least in the case of a considerable percentage of the particles of the addition metal, the size should be less than 0.5 mm., and under certain circumstances less than 0.1 mm.

A particularly uniform distribution is attained according to the invention, by making up the light metal in particles of the required size into packets with a wrapping of paper, cardboard, sheet metal or metal foil, preferably aluminium foil, and introducing the packets for example into the molten steel already in the furnace gutter or only as it drops into the pouring ladle, so that it is carried down into the heart of the melt by the molten steel. As such a packet comprises a large number of very small particles, the narrow gaps between which contain air, it has, on being heated, the properties of a very bad heat conductor or an insulator. The effect of this is that, at the spontaneous heating which takes place at the moment of introduction, the contents of the packet, the greater portion of which is still in the form of solid particles, reaches a point low down in the melt and is only then absorbed. In the case of relatively large solid aluminium bodies (pigs), due to the very high conducting capacity of the aluminium, it has been found that the surrounding steel melt, according to its temperature and the mass or cooling effect of the aluminium body, can sometimes become viscous or solidify as a more or less thick coating and this retardation prevents the solution and distribution of the aluminium imprisoned in the iron and which in the meantime has melted. On the other hand, in the case of a large number of minute solid particles surrounded by air insulation, it has been found that, owing to the elimination of heat conductivity, the local formation of a coating of viscous steel melt does not occur. On the contrary, due to the rapid penetration of the steel melt into the space between the particles which was hitherto filled with air, it is found that the particles are spontaneously forced apart owing to their high surface tension, so that these particles only go into solution when they are already surrounded by particles of the steel melt and are therefore distributed.

Instead of employing this method for introducing the metal additions, these can be introduced either intermittently or continuously directly into the pouring jet, preferably by means of a dosing arrangement, for example, by injection with gas. The process is also applicable for steel production in the converter, the metal addition being injected by means of a gas as far as possible free from oxygen. To improve the skin of the casting, fine grained metal addition can also be added directly on the walls of the chill or mold, for example by dusting.

As the metal addition, owing to the fineness of its grain and as a result of its high surface activity, starts the reaction spontaneously and terminates it very quickly, the process can be also employed with advantages for the largest down to the smallest melt volumes.

When introduced into the casting ladle, the light metal can only be added towards the end of the ladle charge, that is, after the previous process of conversion (for example silicon conversion) is well on its way. On the other hand the process enables the effective treatment of the smallest castings or, even in the case of continuous casting, of the relatively small "smelting sump."

If the metal addition is introduced in the manner described or some other way into the lower portion of the ladle or of any other container carrying the melt (such as a converter, chill or mold) or for example, when casting, preferably bottom casting, a particularly good distribution can be obtained if a portion of the metal addition is composed of particles of very small size and therefore remains near the bottom, whereas the other portions are composed of particles covering a larger range in size, so that they rise in the bath at different speeds. Thus all portions of the bath will be reached by the rising metal addition which can get at the ferrous oxide everywhere. The size of the particles should cover a correspondingly large range, for example from 0 to 1 mm. or from 0 to 3 mms.

The result of the uniform distribution of the alloy is firstly that the existing ferrous oxide is completely reduced to the limit of practicability and consequently the above mentioned faults in material can no longer occur if the added quantity is sufficient. Furthermore, the portion of the metal addition, which has not already combined with oxygen, combines to a maximum extent with the oxygen dissolved in the molten steel and this likewise increases the resistance of the steel to aging. The light metal oxides formed from the fine grained metal addition during the deoxidizing process, and which are also very finely distributed, in addition possess the property of acting as crystallizing nucleus both in the formation of the primary grain and also—in the case of further treatment—in the process of the secondary recrystallization, and thus ensure the uniform composition aimed at for the strength and other technological properties.

In cases where the light metal does not serve or does not serve only for the deoxidation or denitration of molten steel, for example for forming alloys and/or as admixture or addition to another metallic or non-metallic blending agent or the like, it is evident that the invention can also be employed with advantage, because, also in this case—by the useful application of the high surface activity—a rapid and uniform distribution of the blending agent can be attained.

I claim:

1. The process of treating steel and iron melts which comprises introducing a mass of light metal in powdered form deep into said melt by blowing said powdered mass into a pouring jet of said melt, a substantial portion of said mass of powdered light metal comprising granular particles less than 0.5 mm. in size.

2. The process of treating steel and iron melts which comprises introducing deep into said melt a mass of light metal, said mass of light metal being in pulverulent form and comprising particles of substantially different sizes, whereby said differently sized particles are buoyed at different speeds toward the surface of said melt thereby to react with the components of said melt, the largest of said particles having a size not in excess of 3 mm.

3. The process of claim 2 wherein a substantial portion of said pulverulent mass comprises particles less than 0.5 mm. in size.

4. The process of treating steel and iron melts with light metals of the class including aluminum, magnesium, calcium and their alloys, which comprises introducing a powdered addition of metals of said class to said melt, said powdered addition consisting of particles the largest of which has a size not in excess of 3 mm., a substantial portion of said powdered addition comprising particles of spherolithic shape having a size not in excess of 0.5 mm., said introducing step comprising blowing said powdered addition into a pouring jet of said melt with the aid of a substantially oxygen-free gas.

5. The process of claim 1 wherein said light metal comprises aluminum.

6. The process of claim 2 wherein said mass of light metal comprises a metal capable of deoxidizing said melt.

7. The process of claim 2 wherein said mass of light metal comprises a metal capable of denitrating said melt.

References Cited in the file of this patent

UNITED STATES PATENTS

| | | |
|---|---|---|
| 963,973 | Wright | July 12, 1910 |
| 1,193,670 | Davis | Aug. 8, 1916 |
| 1,902,092 | Norwood | Mar. 21, 1933 |
| 2,485,760 | Millis et al. | Oct. 25, 1949 |
| 2,609,289 | McKinney et al. | Sept. 2, 1952 |
| 2,705,196 | Wever et al. | Mar. 29, 1955 |

FOREIGN PATENTS

| | | |
|---|---|---|
| 392,390 | Great Britain | May 18, 1933 |
| 492,896 | Great Britain | Sept. 26, 1937 |